UNITED STATES PATENT OFFICE.

EMILE BRONNERT, OF MULHAUSEN, FRANCE.

MANUFACTURE OF ARTIFICIAL SILK.

1,426,953.            Specification of Letters Patent.     Patented Aug. 22, 1922.

No Drawing.     Application filed September 10, 1920. Serial No. 409,440.

*To all whom it may concern:*

Be it known that I, EMILE BRONNERT, a citizen of the Republic of France, residing at 1 Quai du Barrage, Mulhausen, Alsace-Lorraine, France, have invented certain new and useful Improvements in the Manufacture of Artificial Silk, of which the following is a specification, for which I have filed application in Germany, filed August 9th, 1919; England, France, Italy, Norway, Austria, Sweden, Switzerland, Spain, Czecho-Slovakia, Hungary, Belgium, Denmark, and Netherlands, filed May 28th, 1920; and Finland, filed June 19th, 1920.

It is well known that sugar, and especially glucose, take away the sharpness of sulphuric acid to such an extent, that the mixture of acid and sugar with some safeguard under certain conditions, can be used for making threads from viscose.

Pure acid and sugar have scarcely found any application in working on a large scale. A process set forth in the specifications of British patents 21405/07 and 5595/08 has alone found footing in which the acid and glucose is employed in combination with substances, more especially salts working in another manner for the dissociation of the acid. The said combination can only be used with a special apparatus namely the so-called spinning centrifuges or boxes, where the working process in any case creates special working conditions. All these processes have only had reference to viscose silks with individual threads of from 7 to 10 deniers, hitherto alone considered as technically produceable and as already placed in the market. For these threads the present process is not claimed. Now new researches have shown that the fineness of thread obtainable is a function of the sulphuric acid concentration whereby smaller differences exist according to whether at the same time salts are present to a greater or lesser extent i. e. above or below the proportion of a bisulphate or whether acid ammonium salt solutions are used.

It has therefore, been taught to produce with the ordinary spinning apparatus very fine individual threads 6 to 1 denier and less.

Now according to the so-called square root law described in my prior applications Serial Nos. 395,350 and 406,911, relatively high acid concentrations are necessary for obtaining such fine threads and it is advisable for the simultaneous obtaining of maximum lustre and maximum softness to add certain substances to the sulphuric acid, in order to prevent a parchmenting effect.

Now it has been discovered that glucose works in a remarkable manner. Thus it is absolutely unnecessary to add unusually large quantities of glucose to the bath, but quantities of about 100 grams per litre will suffice.

The baths of sulphuric acid, of regulable concentration to suit the titrations or strengths in use at the time, to which glucose has been added are used preferably at the usual temperature of 45°.

A spinning length of 15 to 20 centimetres is sufficient in most cases.

For the coarser as also for the finest threads use is made of the usual nozzles with 0.10 millimetres diameter openings and of the usual discharge speed of 40 to 45 metres. The viscose may have a ripeness or maturity of from 6 to 12 chloride of ammonium degrees.

In a surprising manner a further material advantage resulted when using sulphuric acid containing glucose. Whilst with the use of sulphuric acid alone it is essential to observe very accurately the acid concentration and temperature suitable for the age of the viscose, in order to secure useful products (immature viscose requires only about 10% acid and heating is to be avoided, whilst mature viscose requires a 20% acid and a supply of heat is an essential condition), the degree of ripeness with sulphuric acid to which glucose has been added of for example 120 grams sulphuric acid and 100 grams glucose per litre can vary within the limits of 6 to 12 degrees of ripeness without any substantial differences being apparent in the final products. The practical advantages of the sulphuric acid glucose process for working on a large scale with all its dangers and possibilities of disturbance are therefore apparent.

Instead of glucose other polyatomic alcohols, such as glycerine or glycol, can be used with similar success, and, in the claims, when I speak of glucose, I wish it understood that said polyatomic alcohols are to be considered as equivalents thereto.

I claim:

1. The process of producing very fine viscose threads of 6—1 deniers fineness or less, which comprises forcing the viscose into a precipitant bath consisting of an acid to which a polyatomic alcohol has been added, the concentration of the acid being proportional to the fineness of the thread desired, so that the concentration is increased in accordance with the fineness of the thread to be produced.

2. The process of producing very fine viscose threads of 6—1 deniers fineness or less, which comprises forcing the viscose into a precipitant bath consisting of an acid to which glucose has been added, the concentration of the acid being proportional to the fineness of the thread desired, so that the concentration is increased in accordance with the fineness of the thread to be produced.

3. A spinning bath for the production of very fine viscose threads, of 6—1 deniers or less, from viscose of 6 to 12 degrees of ripeness, consisting of 120 grams sulphuric acid and 100 grams glucose per liter.

In witness whereof I have hereunto signed my name in the presence of two subscribing witnesses.

EMILE BRONNERT.

Witnesses:
L. R. DE SALIS,
N. S. MARBURG.